United States Patent

[11] 3,616,201

[72] Inventor Frank S. Trocino
    Eugene, Oreg.
[21] Appl. No. 867,360
[22] Filed Oct. 17, 1969
[45] Patented Oct. 26, 1971
[73] Assignee Cascade Fiber Co.
    Eugene, Oreg.

[54] EXTENDER FOR THERMOSETTING RESIN
    7 Claims, No Drawings
[52] U.S. Cl. .................................................. 161/262,
    106/288 Q, 117/148, 117/165, 161/162, 161/168,
    260/17.2 R, 260/17.3 R, 260/209
[51] Int. Cl. ........................................................ C08g 51/18,
    C08h 17/18
[50] Field of Search .......................................... 260/9, 17.2,
    17.3, 412.4, 412.8, 209; 106/288; 117/148, 165

[56] References Cited
    UNITED STATES PATENTS

| | | | |
|---|---|---|---|
| 2,574,784 | 11/1951 | Heritage........................ | 260/17.2 |
| 2,662,893 | 12/1953 | Kurth............................ | 260/412.8 |
| 3,025,250 | 3/1962 | Herrick et al................. | 260/17.2 |
| 3,255,221 | 6/1966 | Dowd et al.................... | 260/412.5 |

OTHER REFERENCES

Plastics, Aug. 1947, pp. 44, 65– 67, " Douglas-Fir Bark Utilized as a Filler," Marple Tappi, Apr. 1950, Vol. 33, No. 4, pp. 183– 186, " Wax From Douglas-Fir Bark," Kurth et al.

*Primary Examiner*—William H. Short
*Assistant Examiner*—Edward Woodberry
*Attorney*—Buckhorn, Blore, Klarquist and Sparkman ABSTRACT: Douglas-fir bark is prepared for use as an extender for thermosetting resins by solvent-extracting wax to leave maximum content of 3 percent.

EXTENDER FOR THERMOSETTING RESIN

BACKGROUND OF THE INVENTION

In the formation of cellulosic products such as plywood and bonded-fiber products such as hardboard, softboard, wallboard and the like, it has been the practice to mix a thermosetting adhesive with a filler or extender. Included amongst the extenders which have been utilized heretofore is finely ground Douglas-fir bark, great quantities of which are available and which, for the most part, have been a waste product presenting a disposal problem. However, raw Douglas-fir bark has only been used to a limited extent because of difficulties heretofore encountered in its usage. To obtain a satisfactory adhesive material it has been necessary to cook the resin and raw fir bark for periods up to several hours, and difficulty has been encountered in determining a proper termination time for such cooking. Thus, although vast quantities of the bark have been available, and it would provide a low cost source of extender, only very limited use of the bark as an extender has heretofore been made.

SUMMARY OF THE INVENTION

It is my discovery that the usefulness of Douglas-fir bark as an extender has been inhibited by reason of the relatively large wax content which is present in natural Douglas-fir bark. I have found that if the bulk of such natural wax is extracted by a solvent the resulting bark provides a very satisfactory extender material that is convenient to use. More particularly, is my discovery that if the wax content of Douglas-fir bark is reduced to below about 3 percent by weight on the basis of the dry bark, the bark makes a very satisfactory extender for thermosetting adhesives in the formation of bonded cellulosic products.

DESCRIPTION OF PREFERRED EMBODIMENT

The natural wax content of Douglas-fir bark varies from between about 5 to 10 percent based on the total dry weight of the bark. The exact composition of the wax has not been determined but it is soluble in such usual solvents as hexane or benzene, the chlorinated hydrocarbons, napthalenes, toluene and the like. For the purposes of the invention, the wax content should be reduced below about 3 percent. Suitable extraction techniques will vary, depending upon the nature of the bark being utilized and the solvent selected to extract the wax. However, it has been found that contacting the bark with hexane at its boiling temperature for 3½ hours will, for example, reduce the wax content of the bark sufficiently to permit use of the bark for an extender.

The wax-extracted bark is primarily useful with phenolic resins such as the phenol-formaldehyde resins but is also adaptable as an extender for other thermosetting resins, such as melamine-formaldehyde and urea-formaldehyde resins.

The amount of extender to be used will vary with the resin, the cellulosic material being bonded, and the desired characteristics of the finished product. In general, however, the extender should comprise between about 5 and 10 percent of the total wet adhesive mix.

Preferably also the bark is rather finely ground, preferably having a fineness so as to pass about a 60-mesh screen, although for certain uses coarser material could be utilized.

With the extender of the invention the conventional pressing and temperatures may be utilized. The assembly time can vary from 3 minutes to 30 minutes but preferably should not exceed about 20 minutes.

EXAMPLE I

Douglas-fir bark was extracted with hexane at the boiling temperature of the latter for 3½ hours. The wax content after extraction was less than 3 percent. (This is determined by subjecting a representative bark sample to extraction for another 48 hours and assuming that this results in substantially complete extraction.) The extracted bark was dried and ground so as to pass an 80-mesh screen. This bark was then mixed to form an adhesive having the following composition:
   200 parts Douglas-fir bark
   1,340 parts of Hercules p–42 phenolformaldehyde resin
   470 parts water
   60 parts wheat flour
   68 parts 50 percent sodium hydroxide
   34 parts soda ash Several 5-ply Douglas-fir panels were then made up with the above adhesive with wet spreads of 60 pounds adhesive per thousand square feet of double glue line. The panels were pressed at 285° F. and 175 p.s.i. for 4½ minutes. Some panels were pressed after 3 minutes and others after 30 minutes of assembly.

Similar panels were prepared utilizing instead of the Douglas-fir bark, a filler comprising the solid residue remaining after the acid hydrolysis of pentosan-containing materials such as ground-out hulks, the particular material being manufactured by Quaker Oats Company and marketed under the name NORPROFIL.

The panels were then tested for failure of the bond by Commercial Standard Test PS–66–1 of American NORPROFIL Association with the following results:

| Assembly Time | Press Time | Percent Wood Failure NORPROFIL | Bark |
|---|---|---|---|
| 3 | 4½ | 93 | 99 |
| 3 | 4½ | 100 | 94 |
| 3 | 4½ | 92 | 89 |
| 30 | 4 | 97 | 95 |
| 30 | 4 | 98 | 92 |
| 30 | 4 | 100 | 89 |

EXAMPLE II

In another test three-ply panels with a ⅛-inch face and back and 3/16-inch core were prepared from a phenolic resin of a different manufacture using Douglas-fir bark extracted as in example I. The adhesive had the following composition in parts by weight:
   200 parts Douglas-fir bark
   1,350 parts Chembord Cerac 312 phenol-formaldehyde resin
   440 parts water
   40 parts wheat flour
   87 parts 50 percent sodium hydroxide
   50 parts soda ash The adhesive was spread at 60 pounds adhesive per thousand square feet of double glue line and pressed at 285° and 175 p.s.i. using different assembly and press times. The results as indicated by Commercial Standard Test PS–66–1 were as follows:

| Press Assembly Time | Data Press Time | Wood Failure |
|---|---|---|
| 10 | 8½ min. | 88% |
| 15 | 8½ min. | 87% |
| 20 | 8½ min. | 91% |
| 10 | 8 min. | 87% |
| 15 | 8 min. | 95% |
| 20 | 8 min. | 96% |
| 10 | 7½ min. | 88% |
| 15 | 7½ min. | 91% |
| 20 | 7½ min. | 89% |

As will be observed, the results are well above the requirements of the American Plywood Association for exterior plywood which requires an average wood failure of 85 percent with 95 percent showing 80 percent wood failure or higher, 90 percent showing 60 percent wood failure or higher and 97½ percent showing 30 percent wood failure or higher.

It is to be understood that other additives such as hardening agents, dyes, and other filler agents can be employed for specific applications. While advantageously employed as plywood adhesives, the adhesives of the invention can be usefully employed with other bonded cellulosic products such as flakeboard, chipboard, hardboard or the like.

Having illustrated and described certain embodiments, it will be apparent that the invention permits of modification in arrangement and detail.

I claim:

1. An adhesive composition for use in bonding of cellulosic materials comprising a thermosetting resin selected from the class consisting of phenol-formaldehyde, melamine-formaldehyde and urea-formaldehyde resins and an extender comprising finely ground Douglas-fir bark having a wax content not in excess of about 3 percent.

2. A composition as set forth in claim 1 wherein said resin is a water-soluble phenol-formaldehyde resin.

3. A composition as set forth in claim 2 wherein said bark comprises between about 5 and 10 percent of the composition.

4. A composition as set forth in claim 1 wherein said bark has been extracted with boiling hexane for at least 3½ hours.

5. An extender for use with thermosetting resins comprising finely ground Douglas-fir bark having a wax content less than 3 percent.

6. Hot-pressed plywood glued with a bond of a composition as set forth in claim 1.

7. Hot-pressed plywood glued with a bond of a composition as set forth in claim 2.

UNITED STATES PATENT OFFICE
CERTIFICATE OF CORRECTION

Patent No. 3,616,201          Dated  Oct. 26, 1971

Inventor(s)  Frank S. Trocino

It is certified that error appears in the above-identified patent and that said Letters Patent are hereby corrected as shown below:

Column 2, line 23, "American NORPROFIL Association" should be --American Plywood Association--.

Signed and sealed this 18th day of April 1972.

(SEAL)
Attest:

EDWARD M. FLETCHER, JR.            ROBERT GOTTSCHALK
Attesting Officer                  Commissioner of Patents